United States Patent
Harris (10) Patent No.: US 10,430,579 B2
(45) Date of Patent: Oct. 1, 2019

(54) PASSWORD RECOVERY

(71) Applicant: Osirium Limited, Theale, Berkshire (GB)

(72) Inventor: Andrew Steven Harris, Theale (GB)

(73) Assignee: Osirium Limited, Berkshire (GB)

( * ) Notice: Subject to any disclaimer, the term of this patent is extended or adjusted under 35 U.S.C. 154(b) by 0 days.

(21) Appl. No.: 15/403,099

(22) Filed: Jan. 10, 2017

(65) Prior Publication Data

US 2017/0200002 A1 Jul. 13, 2017

(30) Foreign Application Priority Data

Jan. 11, 2016 (GB) .................................. 1600447.5

(51) Int. Cl.
*G06F 21/45* (2013.01)
*G06F 21/41* (2013.01)
*H04L 29/06* (2006.01)

(52) U.S. Cl.
CPC .............. *G06F 21/45* (2013.01); *G06F 21/41* (2013.01); *H04L 63/0815* (2013.01); *H04L 63/0846* (2013.01); *H04L 63/0884* (2013.01); *G06F 2221/2131* (2013.01)

(58) Field of Classification Search
CPC .. G06F 21/45; G06F 21/41; G06F 2221/2131; H04L 63/0884; H04L 63/0846; H04L 63/0815
See application file for complete search history.

(56) References Cited

U.S. PATENT DOCUMENTS

| 5,944,824 | A * | 8/1999 | He | G06F 21/33 726/6 |
|---|---|---|---|---|
| 6,738,913 | B1 * | 5/2004 | Uchida | G06F 21/31 711/164 |
| 7,150,038 | B1 | 12/2006 | Samar | |
| 9,059,987 | B1 | 6/2015 | Lofland et al. | |
| 2002/0002678 | A1 * | 1/2002 | Chow | G06F 21/31 713/169 |
| 2008/0059804 | A1 | 3/2008 | Shah et al. | |
| 2012/0060213 | A1 * | 3/2012 | Childress | G06F 21/31 726/18 |

(Continued)

OTHER PUBLICATIONS

GB Search Report dated Jun. 23, 2016 for corresponding GB Patent Application No. 1600447.5, 1 page.

(Continued)

*Primary Examiner* — Jeffrey D. Popham
(74) *Attorney, Agent, or Firm* — Lee & Hayes, P.C.

(57) ABSTRACT

An apparatus for use as a single sign on entity (100) for controlling access to one or more devices (104*a-d*) in a computer network, the devices accessible with a device access password; the apparatus comprises a password generator configured to generate current and future device access passwords, a back-up controller configured to store a back-up comprising the current and future device access passwords at the time of the back-up in a memory, a password changer configured to change the current device password to one of the future device access passwords and to control a transmitter to transmit data implementing the change to the device, wherein the back-up controller is configured to restore the device access password from the backed-up future device access passwords, losing the current device access password.

24 Claims, 4 Drawing Sheets

(56) References Cited

U.S. PATENT DOCUMENTS

2014/0089671 A1    3/2014  Logue et al.

OTHER PUBLICATIONS

International Search Report and Written Opinion for corresponding PCT International Application No. PCT/GB2017/050041 dated Mar. 20, 2017, 13 pages.
PCT International Preliminary Report on Patentability for corresponding PCT International Application No. PCT/GB2017/050041 dated Jul. 26, 2018, 10 pages.

* cited by examiner

PASSWORD RECOVERY

This Application claims priority to GB Application No. 1600447.5, filed Jan. 11, 2016, which is incorporated herein by reference.

TECHNICAL FIELD

The invention relates to controlling access to a device within a computer network. In particular, but not exclusively, the invention may relate to the recovery of password data following a failure of an entity within the network.

BACKGROUND

A computer network within an organisation will typically contain a number of devices, which may include PCs and servers, but also switches, routers, wireless access points, IP cameras, projectors, network attached storage and so on. Each device will have a management interface, which may be web-based or may be accessed as applications running on general purpose operating systems such as Windows or Linux. In addition to physical components of a network, a device in this context may itself be an application running on a physical component or over the Internet.

Devices may be controlled by users logging in to user or admin accounts. Some devices may provide only a single management user or admin account, while others may allow many accounts with various levels of functionality, or even integrate directly with organisational user directories. Each user or admin account will typically require a password which is generally required to be regularly changed in accordance with local security policy.

As used herein, the term "password" encompasses any data that may be used to log in to a user or admin account for controlling a device. Accordingly, a password may comprise a user ID and secure data, such as a text string, identifying that user.

Where an organisation has many IT staff there arises the issue of managing multiple admin accounts and maintaining an audit trail of which admin user logged on to which device and when. Additionally, network security may be compromised where the password for an admin account is stolen or misused, allowing access to multiple devices across the network. Matters are compounded when an organisation wishes to allow external users, outside of the organisation's network, to access admin accounts.

This issue has given rise to "single sign on" (SSO) solutions, where an admin user may log on once but gain access to a number of devices and to "privileged user management" where an administrator may be given an appropriate level of access to a device.

SSO solutions may be provided by simply storing passwords, or login credentials, in a database. A user, who may be external to the computer network to be accessed, may transmit a request to the database for password data allowing access to one or more devices as part of a network administration role. In other, less technological SSO solutions, a user may keep a physical record of password data for accessing a device as part of a network administration role in what may be termed a "run book". In these systems, the user consults the run book to identify password data and information allowing access to devices within the computer network.

It is usual for organisations to implement regular back-ups of their systems so that in the event a device fails it can be restored to its original state from the latest back-up. Alternatively, where a particular device cannot be restored, the back-up data may be used to set up a replacement device. A back-up usually comprises a copy of all files and other data held on and used by a particular device. However, back-ups may also be incremental. Back-ups may be stored separately from the devices, often at a different location or in the cloud. The frequency and content of back-ups is generally determined by an organisation's requirements and policy.

SUMMARY

The inventors have appreciated that the timing of back-ups may not always be in synchronisation with the timing of changes to passwords, required for network security. As such, the data stored in a back-up might not correspond to current password data. Exemplary methods and apparatus disclosed herein are aimed at addressing this and/or other problems associated with the prior art.

According to the invention in an aspect, there is provided an apparatus for use as a Single Sign On, SSO, entity for controlling access to a device in a computer network, wherein the device is accessible with a device access password, the apparatus comprising: a password generator configured to generate a current device access password and at least one future device access password; a back-up controller configured to store in a memory a back-up comprising the current device access password and the at least one future device access password at the time of the back-up, a password changer configured to change the current device access password to one of the at least one future device access password and to control a transmitter to transmit data implementing the password change to the device, wherein the back-up controller is configured to restore the device access password from the at least one future device access password of the back-up following a failure resulting in a loss of the current device access password.

The use of stored future passwords allows an SSO to restore its own stored passwords from the back-up such that they correspond to the current device access password used by the device.

Optionally, the apparatus further comprises an access manager configured to use the at least one future device access password of the back-up to access the device.

Optionally, the password generator, in response to the change of current device access password, is configured to generate a further future device access password.

Optionally, the password generator is configured to generate a further future device access password before the change of current device access password.

Optionally, the password generator is configured to generate a number of future device access passwords greater than or equal to a ratio of a time between successive back-ups and a time between successive changes of the device access password.

Optionally, following restoration of the device access password from the at least one future device access password of the back-up, the password generator is configured to generate new future password data.

Optionally, the password generator is configured to generate a plurality of future device access passwords, and wherein the back-up controller is configured to attempt restoration of the device access password from subsequent future device access passwords of the back-up.

Optionally, the password generator is configured to generate a plurality of future device access passwords, and wherein the back-up controller is configured to determine one of the plurality of future device access passwords of the back-up with which to restore the apparatus, based on a date and time of the back-up and/or a date and time of the change of current device access password.

Optionally, the password generator is configured to generate a plurality of future device access passwords, and wherein the apparatus further comprises a user interface for allowing a user to select one of the plurality of future device access passwords with which to restore the apparatus.

Optionally, the password generator is configured to generate a current device access password and at least one future device access password for a plurality of devices.

Optionally, the back-up further comprises past password data.

According to the invention in another aspect, there is provided a method of controlling a Single Sign On, SSO, entity and for controlling access to a device in a computer network, wherein the device is accessible with a device access password, the method comprising: generating, by a password generator, a current device access password and at least one future device access password; storing in a memory, by a back-up controller, a back-up comprising the current device access password and the at least one future device access password at the time of the back-up; changing, by a password changer, the current device access password to one of the at least one future device access password, the password changer controlling a transmitter to transmit data implementing the password change to the device; restoring, by the back-up controller, the device access password from the at least one future device access password of the back-up following a failure resulting in a loss of the current device access password.

Optionally, the method further comprises an access manager using the at least one future device access password of the back-up to access the device.

Optionally, the method further comprises the password generator generating a further future device access password in response to the change of current device access password.

Optionally, the method further comprises the password generator generating a further future device access password before the change of current device access password.

Optionally, the password generator generates a number of future device access passwords greater than or equal to a ratio of a time between successive back-ups and a time between successive changes of the device access password.

Optionally, following restoration of the device access password from the at least one future device access password of the back-up, the password generator generates new future password data.

Optionally, the password generator generates a plurality of future device access passwords, and wherein the back-up controller attempts restoration of the device access password from subsequent future device access passwords of the back-up.

Optionally, the password generator generates a plurality of future device access passwords, and wherein the back-up controller determines one of the plurality of future device access passwords of the back-up with which to restore the apparatus, based on a date and time of the back-up and/or a date and time of the change of current device access password.

Optionally, the password generator generates a plurality of future device access passwords, and wherein a user interface allows a user to select one of the plurality of future device access passwords with which to restore the apparatus.

Optionally, the password generator generates a current device access password and at least one future device access password for a plurality of devices.

Optionally, the back-up further comprises past password data.

According to the invention in a further aspect, there is provided a computer program comprising instructions which, when executed on at least one processor, cause the at least one processor to carry out the methods described herein.

According to the invention in a further aspect, there is provided a carrier containing the computer program, wherein the carrier is one of an electronic signal, optical signal, radio signal, or non-transitory computer readable storage medium.

BRIEF DESCRIPTION OF THE DRAWINGS

Exemplary embodiments of the invention are described herein with reference to the accompanying drawings, in which.

DETAILED DESCRIPTION

Generally, disclosed herein are SSO systems and methods for controlling access to a device in a computer network. The device is accessible using a current device access password. The SSO represents an improvement upon existing SSO or privileged user management (PUM) apparatus and services, as it allows recovery of an SSO after failure of the SSO results in loss of the current device access password for one or more devices. This may be done by generating one or more future device access passwords within the SSO and saving those future device access passwords as part of a back-up. In that way, if the current password is changed following a back-up and is then lost due to failure of the SSO, the SSO can be rolled forward to the future password data of the back-up.

It will be understood that although the following discusses the relationship between a SSO device and one password-protected device, the SSO solution may manage access to more than one device. Access to more than one device may be provided as part of a network administration role. The following description may therefore relate to each device for which the SSO manages access.

Figure 1:
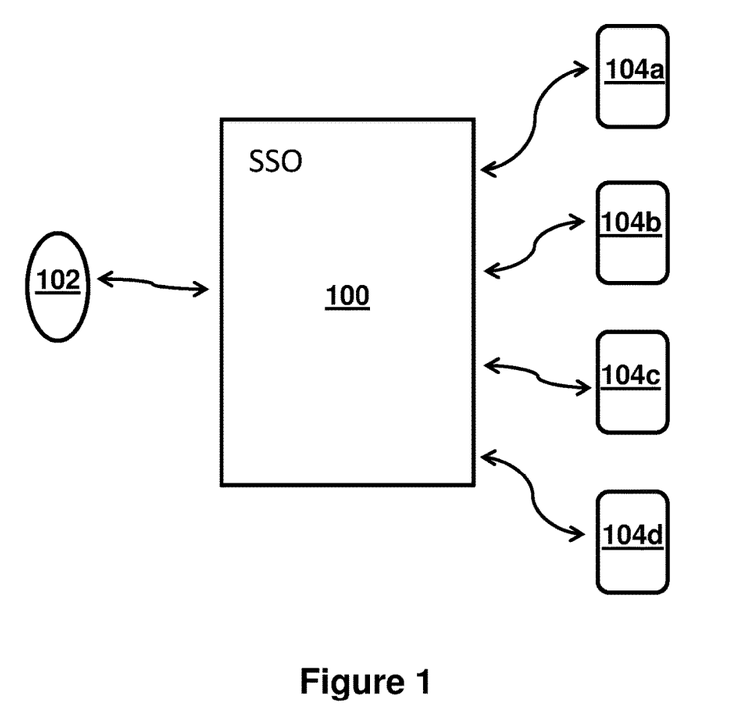
FIG. 1 is a representation of a typical single sign on (SSO) solution.

As shown in FIG. 1, an SSO 100 separates a user 102 and one or more devices 104a-d, so that each user 102 logs on to an SSO 100, which in turn maintains access details, including passwords, for a number of devices 104a-d. The SSO 100 can also store details of which user 102 is permitted access to which device 104, and the level of authority the user 102 should be given. This reduces the number of passwords a user 102 must remember and provides additional security, since the user 102 never directly logs on to any of the network devices 104 and therefore will not know the password of any device's admin account. Typically, the SSO 100 also manages routine password changes for both the devices 104 and the user 102 and, because they are not required to be known by the user 102, the passwords can be long, complicated and, therefore, secure.

Figure 2:
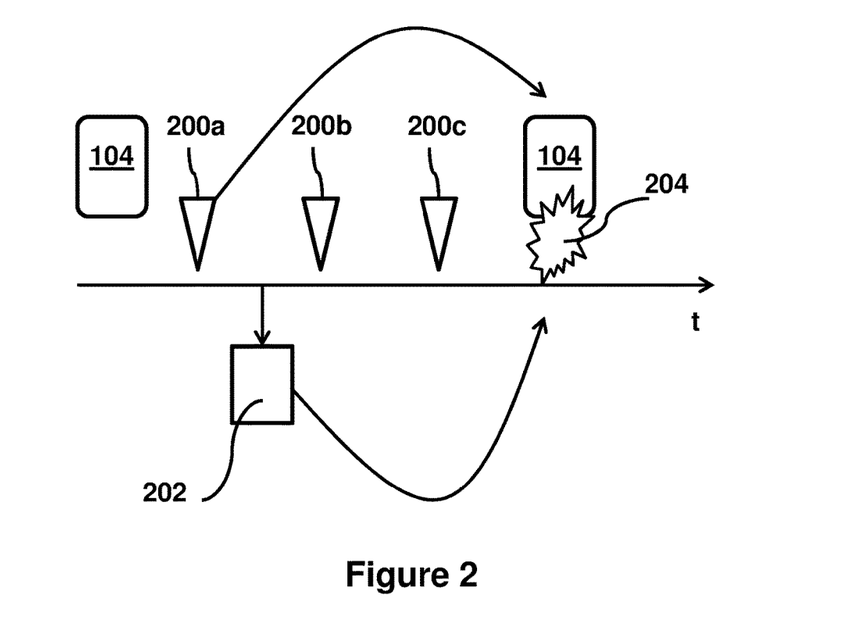
FIG. 2 is a representation of a timeline in which a device is backed-up and subsequently restored from a back-up.

FIG. 2 illustrates a timeline showing a plurality of device access password changes 200a-c for a device 104. The time axis runs from left to right and is labelled t. The SSO (not shown) controls the device access password changes 200a-c and notifies the device 104 of the new current device access password after each change. A back-up 202 is carried out by the SSO after the first device access password change 200a, but before two subsequent device access password changes 200b-c.

In this example, the device 104 suffers a failure 204 after the third device access password word change 200c, but before the next back-up is scheduled to be taken. When the device 104 is restored, the SSO tries to do this from the most recent back-up 202 and the device 104 inherits the device access password following the device access password change 200a. Accessing the device 104 by the SSO using the current password will therefore not be possible. In this example, more than one device access password change 200 has been carried out on the 104 since the last back-up 202. Hence, the password stored in the back-up 202 and the current device access password may be out of step by more than one password change 200a-c, and a user wishing to log onto the device will not know which historic password is now active.

Figure 3:
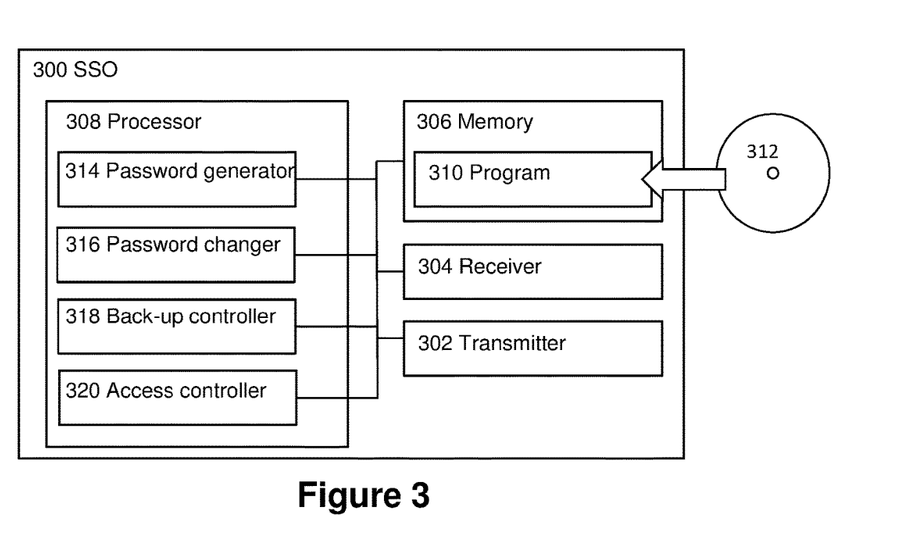
FIG. 3 is a representation of an SSO for providing access to a device in a computer network.

FIG. 3 shows a schematic representation of an SSO 300, which may be the SSO 100 in the architecture of FIG. 1. The SSO 300 comprises a transmitter 302 and a receiver 304. The transmitter 302 and receiver 304 may be in data communication with other network entities such as UEs, servers and/or functions in a computer network and are configured to transmit and receive data accordingly.

The SSO 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake one or more of the functions of a password generator 314, password changer 316, back-up controller 318 and access controller 320, as set out below.

Each of the transmitter 302 and receiver 304, memory 306, processor 308, password generator 314, password changer 316, back-up controller 318 and access controller 320 is in data communication with the other features 302, 304, 306, 308, 310, 314, 316, 318 of the SSO 300. The SSO 300 can be implemented as a combination of computer hardware and software. In particular, the password generator 314, password changer 316, back-up controller 318 and access controller 320 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the password generator 314, password changer 316, back-up controller 318 and access controller 320, but are not limited to such.

The SSO 300 may further comprise a user interface. The password generator 314 is configured to generate and/or store current and future device access passwords. Future device access passwords comprise stored passwords which have not yet been used as the device access password for a device, but which are intended to be used as such at a future point in time.

The back-up controller 318 is configured to create and store a back-up comprising the current and future device access passwords. The back-up is created at a particular time, based upon an SSO's back-up policy or particular needs. The back-up may include other data and/or files relating to the SSO 300, in addition to password data. The back-up controller 318 is configured to restore the SSO 300 such that it is using a current device access password, based on the future device access passwords of the back-up, following a failure of the SSO 300 and/or the device 104.

The password changer 316 is configured to change the current device access password to a previously generated future device access password. A device access password change may be requested by the SSO 300 substantially periodically as part of an organisation's local security policy, or it may be performed on demand or triggered by some other event. The password changer 316 further controls the transmitter 302 to transmit data implementing a password change to the device 104. Transmission may take place in any way normally used within a computer network. The access controller 320 may be configured to control the transmitter 302 to transmit future device access password(s) to access the device 104 after the device access password has been changed.

As used herein, "past" encompasses a password which was used to access a device at a point in time which is now in the past; "current" encompasses a password with which the device 104 can currently be accessed (e.g. an administrator account password); and "future" encompasses a password which is intended for use in accessing the device 104 at a point in time which is in the future. Future device access passwords may be configured not to include passwords which have already been used for that device or user. Future device access passwords may be generated by any known random password generation method.

The SSO 300 generates and/or stores device access passwords using the password generator 314. The password generator 314 may be configured to generate and/or store further future device access passwords in response to, or in advance of, a change of a current device access password. The generation and storing of a future device access password may take place before the current device access password is actually changed. As discussed above, the password generator 314 may be configured to generate and/or store passwords for a plurality of devices 104.

The current and future device access password data may be encrypted against a rich keystore-passphrase. The data can be stored on a stand-alone or cloud-based application and used to serve passwords in the event of a total failure of the SSO 300.

A device password change may be requested by the SSO 300 at a pre-defined date and time, as required by local security policy. Alternatively, the password change request may be on demand.

In response to a device access password change request, the password changer 316 changes the current device access password to a previously generated future device access password and the password generator 314 generates a new future device access password. The new future device access password is stored for use as a device access password at some point in the future.

It will be noted that the current device access password and the device access password which is about to be used are therefore both available to the SSO 10 at the same time.

The password generator 314 now updates the password data to reflect the new current device access password, and marks the previous device access password as a past device access password. Details of when the password change took place may also be stored.

In addition to generating and/or storing current and future device access passwords, the password generator 314 may also store at least one past device access password. This past device access password may also be included in the back-up taken by the back-up controller 318 whenever the SSO 300 is backed-up. The backed-up version of the password data may be used to restore the SSO 300 if/when the SSO 300 is restored following a failure that results in a loss of the current device access password for a device 104. Such a failure may comprise a failure of the network and/or a failure of the SSO 300. The example of a failure of the SSO 300 is used herein, although it should be noted that this encompasses other types of failure that result in the loss of the current device access password. Where past device access password data is stored, the password generator 314 may additionally keep track of a time when a past device access password was used to access the device 104.

As used herein, failure may mean any occurrence which necessitates or leads to a recovery from a back-up to be performed. This may include, but is not limited to, a network failure, a failure of software in the SSO 300 or another entity, which may be caused by corruption, virus attack, incompatibility, incorrect installation, mismanagement, or user intervention, either deliberate or inadvertent. A failure may also include, but is not limited to, a failure of hardware (where the hardware may comprise a device or SSO itself or may be hardware on which the device or SSO runs) caused by physical damage, wear, obsolescence, corruption, virus attack, incompatibility, misinstallation, mismanagement, or user intervention, either deliberate or inadvertent. A recovery from a back-up may also be carried out for reasons other than hardware or software failure.

As stated above in respect of FIG. 2, following restoration of a device 104 from an out of date back-up 202, the SSO 300 may attempt to log on to a device 104 with a device access password 200c, when the restored device is using an earlier device access password 200a that has been stored in the back-up 202. In this circumstance, the password generator 314 of the SSO 300 may be configured to roll back or revert to an earlier point in time when the old password 200a was still the current device access password. This may be done via the user interface. The user interface may provide a user, typically an administrator, with the option of rolling back to a range of points in time, such that different past or historic passwords may be attempted. Alternatively, the access controller 320 may be configured to try a plurality of past device access passwords. When the access controller 320 finds a past device access password with which it can access the device 104, it logs on to the device 104. The password changer 316 may then control the transmitter 302 to transmit a request to the device 104 to change its current device access password change to the most recent device access password 200c. The SSO 300 may then roll forward again to the present time. At this point, both the device 104 and the SSO 300 are substantially configured as they were prior to the device failure 204.

Figure 4:
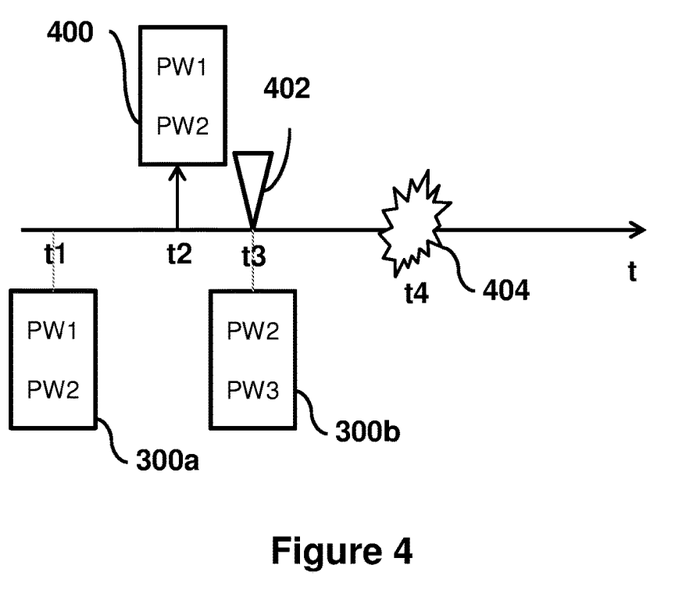
FIG. 4 is a representation of a timeline, in which the SSO suffers a failure.

FIG. 4 is a representation of a timeline in which a failure results in the loss of the device access password from the SSO 300. This may be an event in which the SSO 300 suffers a failure or in which the network or another entity suffers a failure.

The password generator 314 generates and may store a current device access password PW1 and a future device access password PW2. These are shown in a representation of the status of the SSO 300a at t1. Sometime later at t2, the back-up controller 318 stores a back-up 400 comprising the current device access password PW1 and the future device access password PW2. In accordance with local and/or SSO security policy, a change of device access password 402 is undertaken by the password changer 316 at t3. As a result of the device access password change 402, the current device access password is updated to be PW2. Either before, after or during the device access password change 402, the password generator 314 may generate a further future device access password PW3. This is reflected in a second representation of the status of the SSO 300b at t3.

A failure 404 at t4 results in a loss of the current device access password PW2 for the device 104. The SSO 300 therefore restores itself from the back-up 400. However, the current device access password stored in the back-up 400 is PW1, which is out of date. The SSO will not be able to access the device 104 using PW1. Therefore, the SSO 300 restores using the future device access password PW2 stored in the back-up 400. Following the device access password change 402, the current device access password of the device is PW2, which means that the SSO 300 can access the device 104.

Where more than one future device access password is stored in the back-up 400, the SSO 300 may be configured to determine which future device access password may be used to access the device 104. This determination may be based upon the date and time of the back-up and/or the date and time of the device access password change.

The user interface may be used to instruct the SSO 300 to select a future device access password from the plurality of future device access passwords that have been restored to the SSO 300 from the back-up 400. Where the back-up comprises a plurality of future password data, the SSO 300 may be instructed via the user interface to try a number of future device access passwords until one is selected which gains access to the device 104. In other words, the access controller 320 is configured to control the transmitter 302 to transmit future device access passwords to the device 104 until the device 104 is accessed.

Alternatively, where the back-up comprises a plurality of future device access passwords, but the correct future password is known, the user interface may be used to select that password in order to access the device 104.

Exemplary SSOs may be configured to try a first future device access password, stored in a back-up, and if that fails to gain access to a device, the SSO may then try one or more stored future device access passwords adjacent (in respect of time) to the first future device access password.

Once the SSO 300 gains access to the device 104 using a future device access password, the password generator may be configured to generate new future device access password (s) to ensure that protection is provided against future failures of the SSO 300.

In exemplary scenarios, the SSO 300 may be restored from an SSO back-up first. For example, a current device access password at the time the back-up of the SSO 300 was taken is restored. The device 104 is then restored from a device back-up. In this example, the current device access password at the time the device back-up was taken is restored. Since the passwords match, the SSO 300 should be able to access the device 104 using the restored password from the SSO back-up. Once access has been established, the user interface may be used to instruct the SSO 300 to request a device access password change. The device access password is then changed to a future password, which was the current device access password prior to the failure.

In a case where the current device access password at the device 104 and the SSO 300 are not the same upon recovery from back-up e.g. because the device back-up and SSO back-up were not taken at the same time, then the SSO 300 may be configured to try to access the device 104 using a future device access password, or using a past device access password. Where information regarding the date/time of back-ups and/or password changes is not available, the SSO 300 may be configured to attempt access to the device 104 using a combination of future and past device access passwords. This process may be continued until access is successful or may be limited to a predetermined number of tries.

In a case where either the device 104 or the SSO 300, or both, fail during a device access password change, a user may not know whether the password change was successful or not, and therefore which of the current device access password and the future device access password of the back-up should be used to access the device 104. As described above, the SSO 300 can be configured, optionally via the user interface, to attempt logging in to the device 104 using one or more of a past, current and future device access passwords. In this situation, it will be appreciated that generating new future device access passwords prior to carrying out a device access password change may be beneficial.

From the above it can be seen that the generation and storage of future device access passwords enables the SSO 300 to gain access to a device 104 even after a failure of the SSO 300. However, it is crucial that the correct number of future passwords are generated and stored by the password generator.

In other exemplary scenarios, the SSO 300 undergoes a failure, necessitating a recovery from an SSO back-up. The timeline illustrates that a number of SSO back-ups and device access password changes have taken place prior to this SSO failure. Each time a SSO back-up is taken a different version of the future device access password is stored. For example only, the first SSO back-up stores a past device access password, a current device access password and a future device access password. All three are device access passwords which have been, are or will be used to access an account on the device 104.

A password change takes place on the device 104 and a new device access password is provided by the password generator 316. The new device access password is stored in the SSO back-up the next time one is taken. This process continues, in line with an organisation's security policy regarding frequency of password changes and back-ups, until the SSO 300 suffers a failure. On this occasion, the SSO 300 cannot be restored from the most recent SSO back-up. This may be because the most recent SSO back-up failed, or because it is in some way unusable.

As a result, the SSO 300 is restored from an earlier SSO back-up. This earlier SSO back-up contains a version of the password data which comprises one past, one current and one future device password. However, all three passwords are in fact past or historic passwords and are seen as such by the device 104. In other words, the SSO back-up used to restore the SSO 300 contains a version of the password data which is too old to contain the actual current device password. Regardless of which password in the password data the SSO 300 is configured to try, none will allow access to the device 104.

It will be understood from the illustrative example above that the SSO 300 is therefore configured to generate and store sufficient future passwords in the password data to ensure that the number of stored future passwords "n" always exceeds the ratio of the time between SSO back-ups to the time between device password changes. In this way, even if each SSO back-up contains a different current device password, the current device password is always available in the version of the future password data stored in the back-up.

Figure 5:
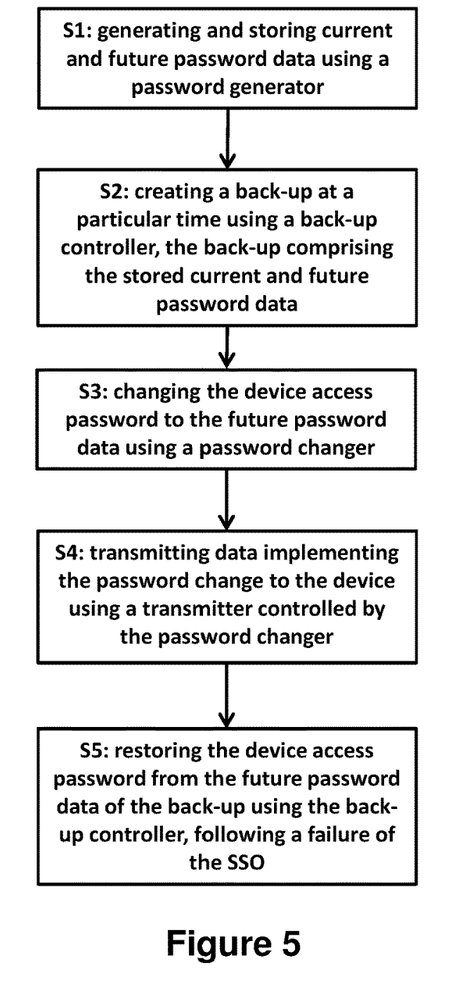
FIG. 5 is a representation of a method for providing access to a device in a computer network.

FIG. 5 illustrates a method of controlling access from an SSO 300 to a device 104 in a computer network. The method comprises the following steps:

S1: Generating and storing a current device access password and at least one future device access password using a password generator 314;

S2: Creating and storing a back-up at a particular time using a back-up controller 318. The back-up comprises the current device access password and the at least one future device access password at the time the back-up was taken;

S3: Changing the current device access password to one of the at least one future device access passwords using a password changer 316;

S4: Transmitting data implementing the current device access password change to the device 104 using a transmitter 302 controlled by the password changer 316; and S5: Restoring the device access password from the at least one future device access password of the back-up using the back-up controller 318, following a failure of the SSO that results in a loss of the current device access password from the SSO 300.

The method may also include the access controller 320 controlling the transmitter 302 to transmit the restored device access password to the device 104 to access the device 104.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The term "device" as used herein may be defined as any piece of hardware, software or application which requires access credentials i.e. a user name and password. Devices may include PCs, servers, laptops, tablets, mobile phones, multimedia storage devices, switches, bridges, routers, media converters, wireless access points, IP cameras, projectors, network attached storage and the like.

The term "single sign on" (SSO) as used herein means a solution which allows a user to enter a single username and password in order to access multiple applications or devices within one or more computer networks. The user is then authenticated for all the devices and applications they have been given permission to access and does not need to sign in again to access another application or device during a particular session.

The term "privileged user management" (PUM) as used herein means a solution which controls access to administrative accounts existing on devices and applications. A PUM may grant different access privileges to different users. It may also limit the length of access to a particular device account and may provide an activity log.

It will be appreciated by the person skilled in the art that various modifications may be made to the above described embodiment, without departing from the scope of the invention as defined in the appended claims.

The invention claimed is:

1. An apparatus for use as a Single Sign On, SSO, entity for controlling access to a device in a computer network, wherein the device is accessible with a multi-use device access password, the apparatus comprising:
   a hardware processor; and
   a computer-readable medium having computer executable instructions therein that when executed by the hardware processor configure the apparatus to:
   generate a current device access password PW1 and at least one future device access password PW2;
   store in a memory a back-up comprising the current device access password PW1 and the at least one future device access password PW2 at the time of the back-up;
   control a transmitter to transmit current device access password PW1 to the device for implementing setting the device access password to PW1;
   access the device multiple times by controlling the transmitter to transmit the current device access password PW1 to the device;
   update the current device access password to be the at least one future device access password PW2, and control the transmitter to transmit the updated current device access password PW2 to the device for implementing the update of the current device access password to PW2;
   access the device multiple times by controlling the transmitter to transmit the updated current device access password PW2 to the device; and
   following a failure of the apparatus resulting in a loss of the updated current device access password PW2, restoring the device access password to be the updated device access password PW2, by retrieving PW2 from the back-up, where PW2 was previously stored as a future device access password, so that the restored updated current device access password matches the device access password PW2 of the device.

2. An apparatus as claimed in claim 1, wherein the hardware processor is further configured to use the updated current device access password PW2, stored as a future device access password PW2 of the back-up, to access the device.

3. An apparatus as claimed in claim 1 wherein the hardware processor, in response to the update of current device access password, is configured to generate a further future device access password.

4. An apparatus as claimed in claim 1, wherein the hardware processor is configured to generate a further future device access password before the update of current device access password.

5. An apparatus as claimed in claim 1 wherein the hardware processor is configured to generate a number of future device access passwords greater than or equal to a ratio of a time between successive back-ups and a time between successive changes of the device access password.

6. An apparatus as claimed in claim 1 wherein following restoration of the device access password, to the updated current device access password PW2 stored as a future device access password PW2 of the back-up, the hardware processor is configured to generate a new future password.

7. An apparatus as claimed in claim 1 wherein the hardware processor is configured to generate a plurality of future device access passwords, and wherein the hardware processor is further configured to attempt restoration of the device access password to the updated current device access password from subsequent future device access passwords of the back-up.

8. An apparatus as claimed in claim 1, wherein the hardware processor is configured to generate a plurality of future device access passwords, and wherein the hardware processor is further configured to determine one of the plurality of future device access passwords of the back-up with which to restore the device access password of the apparatus to the updated current device access password, based on a date and time of the back-up and/or a date and time of the update of current device access password.

9. An apparatus as claimed in claim 1, wherein the hardware processor is configured to generate a plurality of future device access passwords, and wherein the hardware processor further generates a user interface programmed to receive a selection of one of the plurality of future device access passwords with which to restore the apparatus.

10. An apparatus as claimed in claim 1, wherein the hardware processor is configured to generate a current device access password and at least one future device access password for a plurality of devices.

11. An apparatus as claimed in claim 1, wherein the back-up further comprises a past password.

12. A method of controlling a Single Sign On, SSO, entity and for controlling access to a device in a computer network, wherein the device is accessible with a multi-use device access password, the method comprising:
   generating a current device access password PW1 and at least one future device access password PW2;
   storing in a memory a back-up comprising the current device access password PW1 and the at least one future device access password PW2 at the time of the back-up;
   controlling a transmitter to transmit current device access password PW1 to the device for implementing setting the device access password to PW1;
   accessing the device multiple times by controlling a transmitter to transmit the current device access password PW1 to the device;
   updating the current device access password to be the at least one future device access password PW2, and controlling the transmitter to transmit the updated current device access password PW2 to the device for implementing the password update to PW2 to the device;
   accessing the device multiple times by controlling the transmitter to transmit the updated current device access password PW2 to the device; and
   following a failure resulting in a loss of the updated current device access password PW2, restoring the device access password to be the updated current device access password PW2 by retrieving PW2 from the back-up, where PW2 was previously stored as a future device access password, so that the restored updated current device access password matches the device access password PW2 of the device.

13. A method as claimed in claim 12, further comprising using the updated current device access password PW2 stored as a future device access password PW2 of the back-up, to access the device.

14. A method as claimed in claim 12, further comprising generating a further future device access password in response to the update of current device access password.

15. A method as claimed in claim 12, further comprising generating a further future device access password before the update of current device access password.

16. A method as claimed in claim 12, further comprising generating a number of future device access passwords greater than or equal to a ratio of a time between successive back-ups and a time between successive changes of the device access password.

17. A method as claimed in claim 12, further comprising following restoration of the device access password to the updated current device access password PW2 stored as a future device access password PW2 of the back-up, generating a new future password.

18. A method as claimed in claim 12, further comprising generating a plurality of future device access passwords, and attempting restoration of the device access password to the updated current device access password from subsequent future device access passwords of the back-up.

19. A method as claimed in claim 12, further comprising generating a plurality of future device access passwords, and determines one of the plurality of future device access passwords of the back-up with which to restore the device access password to the updated current device access password, based on a date and time of the back-up and/or a date and time of the update of current device access password.

20. A method as claimed in claim 12, further comprising generating a plurality of future device access passwords, and generating a user interface, programmed to receive a selection of one of the plurality of future device access passwords with which to restore the device access password.

21. A method as claimed in claim 12, further comprising generating a current device access password and at least one future device access password for a plurality of devices.

22. A method as claimed in claim 12, wherein the back-up further comprises a past password.

23. A system comprising:
   at least one hardware processor; and
   a computer-readable medium, coupled to the at least one hardware processor, having recorded thereon a computer program comprising instructions which, when executed on the at least one hardware processor, cause the at least one hardware processor to carry out a method comprising:
   generating a current device access password PW1 and at least one future device access password PW2;
   storing in a memory a back-up comprising the current device access password PW1 and the at least one future device access password PW2 at the time of the back-up;
   controlling a transmitter to transmit current device access password PW1 to the device for implementing setting the device access password to PW1;
   accessing the device multiple times by controlling the transmitter to transmit the current device access password PW1 to the device;
   updating the current device access password to be the at least one future device access password PW2, and controlling the transmitter to transmit the updated current device access password PW2 to the device for implementing the password update to PW2 to the device;
   accessing the device multiple times by controlling the transmitter to transmit the updated current device access password PW2 to the device; and
   following a failure resulting in a loss by the computer program of the updated current device access password PW2, restoring the device access password to be the updated current device access password PW2 by retrieving it from the back-up where it was previously stored as a future device access password PW2, so that the restored updated current device access password matches the device access password PW2 of the device.

24. A carrier containing a computer program, wherein the carrier is a non-transitory computer readable storage medium, and wherein the computer program comprises instructions which, when executed on at least one processor, cause the at least one processor to carry out a method comprising:

generating a current device access password PW1 and at least one future device access password PW2;

storing in a memory a back-up comprising the current device access password PW1 and the at least one future device access password PW2 at the time of the back-up;

controlling a transmitter to transmit current device access password PW1 to the device for implementing setting the device access password to PW1;

accessing the device multiple times by controlling the transmitter to transmit the current device access password PW1 to the device;

updating the current device access password to be the at least one future device access password PW2, and controlling the transmitter to transmit the updated current device access password PW2 to the device for implementing the password update to PW2 to the device;

accessing the device multiple times by controlling the transmitter to transmit the updated current device access password PW2 to the device; and following a failure resulting in a loss of the updated current device access password PW2, restoring the device access password to be the updated current device access password PW2 by retrieving it from the back-up where it was previously as a future device access password PW2, so that the restored updated current device access password matches the device access password for PW2 of the device.

* * * * *